3,274,321
METHOD OF MAKING CLEAR CELLULOSE FILMS FROM GREEN VISCOSE

John L. Justice, Wallingford, Pa., assignor, by mesne assignments, to FMC Corporation, San Jose, Calif., a corporation of Delaware
No Drawing. Filed Mar. 28, 1961, Ser. No. 98,734
4 Claims. (Cl. 264—189)

This invention relates to the manufacture of clear cellulose films from green viscose.

To obtain a film of good clarity from a viscose solution, it has been necessary to age the viscose. In practice, the viscose is aged until the common salt index has fallen to around 2. Films cast from viscose of high salt index are cloudy because of the presence of many minute voids throughout the film.

It is an object of this invention to provide a method for preparing clear films from viscose with a greatly reduced aging period. Further objects of the present invention will become obvious from the following description.

In accordance with this invention a method of forming clear films from green viscose comprises coagulating a pellicle of viscose having a common salt test index of over 5 in the presence of an aldehyde selected from the group consisting of formaldehyde and glyoxal.

Prior to the present invention viscose has been coagulated in the presence of an aldehyde such as formaldehyde in the process of spinning high tenacity rayon. Pellicles of regenerated cellulose also have been treated with an aldehyde after the coagulation step. These prior art methods do not accomplish the objects of the present invention.

Viscose solutions which are useful in accordance with this invention comprise, for example, from about 20 to 40% by weight of carbon disulfide, based on the alpha-cellulose content of the cellulose pulp and preferably about 25–35%; from about 4 to about 8%, preferably 5 to 7%, by weight of sodium hydroxide based on the viscose solution; and from about 6 to 12% and preferably 8 to 10% by weight of cellulose based on the viscose solution. The sodium chloride salt test index for viscose useful for the present invention is at least 5 and preferably at least 10. The upper limit of the salt test index for viscose varies depending on the particular viscose solution used. However, it is a general rule that a much clearer film will be obtained from any viscose having a higher salt test index if formaldehyde or glyoxal is present during coagulation than if no formaldehyde or glyoxal is present.

The aldehydes applicable for this invention include formaldehyde or its equivalent; for example, sym-trioxane and paraformaldehyde, and glyoxal. A number of other aldehydes have been tried but either did not possess the property of promoting clear films or possessed this property in only a slight degree. It is preferred for this invention to use formaldehyde in the coagulating bath to improve clarity of the cellulose pellicle since formaldehyde has the added property of producing a skin on the viscose film making it a tougher product.

The aldehydes are useful in the coagulating bath in an amount ranging from 0.5 to over 2% of the bath solution. Amounts over 2% can be used but offer no further advantage. It is preferred that amounts ranging from about 1 to 2% of the aldehyde be used in the coagulating bath. The aldehyde may be added to the viscose just prior to casting to obtain the clear films from green viscose. It is not recommended, however, that the aldehyde be added to the viscose for any length of time prior to casting since it causes the viscose to gel more rapidly than normal, particularly in a riper viscose.

In general, the coagulating baths useful for this invention are the conventional acid type containing from about 7 to 15% by weight of sulfuric acid and from about 10 to 25% by weight of sodium sulfate. Coagulation and regeneration can be carried out in the same bath, or as in the preferred form of the invention, an additional regenerating bath can be used subsequent to the coagulating bath. The regenerating bath contains from about 4 to 10% sulfuric acid and from 7 to 15% sodium sulfate.

The invention is further described in the following examples demonstrating a preferred form of the invention.

Example I

A viscose containing by weight 8.0% cellulose, 6.0% NaOH and 30% $CS_2$, on the basis of the cellulose, and having a common salt index of 12 was poured over plate glass measuring 16 inches by 8⅜ inches. The excess viscose was scraped off by a knife blade adjusted to be 0.008 inch above the surface of the glass plate. The glass was immersed in a coagulating bath containing 13.5% sulfuric acid and 22% sodium sulfate. When the film floated free of the plate it was immersed in a regenerating bath containing 4.5% sulfuric acid and 14.5% sodium sulfate at room temperature for one minute. After washing in water for at least 15 minutes, the film was desulfurized in 0.5% sodium sulfide solution for one minute at 75° C., washed, bleached in a conventional bleach solution at room temperature for 2 minutes, washed again, plasticized with 5% glycerine solution at 45° C. for one minute and dried in a wooden frame. Films prepared in this manner were hazy or cloudy and contained many minute voids throughout the film.

Example II

A viscose containing by weight 8.0% cellulose, 6.0% NaOH and 30% $CS_2$, on the basis of the cellulose, and having a common salt index of 12 was poured over plate glass measuring 16 inches by 8⅜ inches. The excess viscose was scraped off by a knife blade adjusted to be 0.008 inch above the surface of the glass plate. The glass was immersed in a coagulating bath containing 13.5% sulfuric acid, 22% sodium sulfate and 2% formaldehyde. When the film floated free of the plate it was immersed in a regenerating bath containing 4.5% sulfuric acid and 14.5% sodium sulfate at room temperature for one minute. After washing in water for at least 15 minutes, the film was desulfurized in 0.5% sodium sulfide solution for one minute at 75° C., washed, bleached in a conventional bleach solution at room temperature for 2 minutes, washed again, plasticized with 5% glycerine solution at 45° C. for one minute and dried in wooden frames. Films prepared in this manner were bright, clear films with a minimum amount of haze.

While preferred embodiments of the invention have been disclosed, the description is intended to be illustrative and it is to be understood that changes and variations may be made without departing from the spirit and scope of the invention as defined by the appended claims.

I claim:
1. A method of forming clear films from green viscose comprising coagulating a pellicle of viscose having a common salt test index of at least 5 in a coagulating bath containing from about 0.5 to about 2% by weight based on the bath of an aldehyde selected from the group consisting of formaldehyde and glyoxal in the absence of zinc salts.

2. A method of forming clear films from green viscose comprising coagulating a pellicle of viscose having a common salt test index of at least 10 in an aqueous coagulating bath comprising from 7 to 15% by weight of sulfuric acid, from 10 to 25% by weight of sodium sulfate and from about 0.5 to 2% by weight of an aldehyde selected from the group consisting or formaldehyde and glyoxal in the absence of zinc salts.

3. A method of forming clear films from green viscose comprising coagulating a pellicle of a viscose containing from 6 to 12% by weight of cellulose, 4 to 8% by weight of sodium hydroxide, from 20 to 40% by weight of carbon disulfied based on the alpha cellulose content of the pulp, and having a common salt test index of at least 10 in a coagulating bath containing 7 to 15% by weight of sulfuric acid, 10 to 25% by weight of sodium sulfate and from 1 to 2% by weight of formaldehyde in the absence of zinc salts, and regenerating the pellicle.

4. A method of forming clear films from green viscose comprising coagulating a pellicle of a viscose containing from 8 to 10% by weight of cellulose, from 5 to 7% by weight of sodium hydroxide, from 25 to 35% by weight of carbon disulfide based on the alpha cellulose content of the pulp and having a common salt index of at least 10 in a coagulating bath containing from 7 to 15% by weight of sulfuric acid, 10 to 25% by weight of sodium sulfate and from 1 to 2% by weight of formaldehyde in the absence of zinc salts, and regenerating the pellicle in a bath containing from 4 to 10% by weight of sulfuric acid and from 7 to 15% sodium sulfate.

References Cited by the Examiner
UNITED STATES PATENTS

| | | |
|---|---|---|
| 2,607,955 | 8/1952 | Drisch et al. |
| 2,937,070 | 5/1960 | Cox. |
| 2,991,510 | 7/1961 | Ingersoll. |
| 3,018,158 | 1/1962 | Mitchell et al. |
| 3,112,158 | 11/1963 | Braunlich et al. _____ 264—189 |

OTHER REFERENCES

Ott, Emil: "Cellulose and Cellulose Derivatives," interscience Publ. Inc., 1943, pp. 826–838.

ALEXANDER H. BRODMERKEL, *Primary Examiner.*

MICHAEL V. BRINDISI, *Examiner.*

S. NEIMARK, R. J. DOHERTY, K. W. VERNON, A. L. LEAVITT, J. H. WOO, *Assistant Examiners.*